Nov. 14, 1933.  R. D. EVANS  1,935,289
PROTECTIVE SYSTEM
Original Filed Sept. 19, 1928
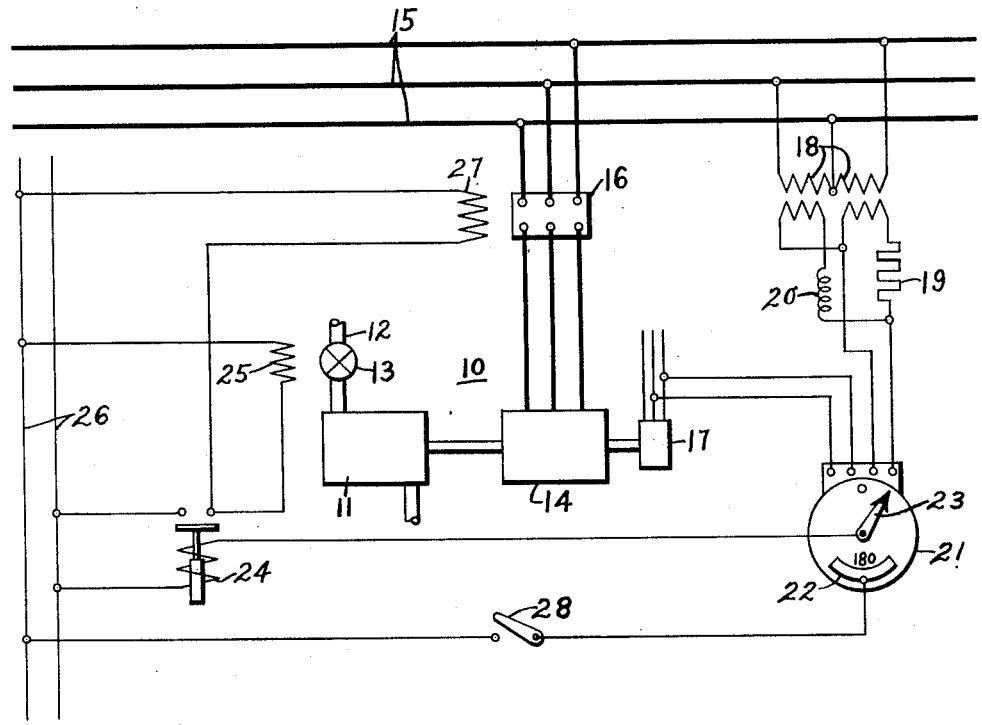
INVENTOR
Robert D. Evans
BY
ATTORNEY Patented Nov. 14, 1933

1,935,289

UNITED STATES PATENT OFFICE 1,935,289

PROTECTIVE SYSTEM

Robert D. Evans, Swissvale, Pa., assignor to Westinghouse Electric & Manufacturing Company, a corporation of Pennsylvania Application September 19, 1928, Serial No. 306,827
Renewed September 23, 1931

36 Claims. (Cl. 175—294)

My invention pertains, in general, to protective systems, and in particular, to a protective system for a generator which is adapted normally to supply energy to a power distribution circuit.

Recent developments in the electrical art have included transmission line protective systems of elaborate design and great accuracy in operation. It appears, however, that no similar protective systems have been devised for use in connection with generating units excepting, of course, the well-known overload and short-circuit protective systems. At present, as far as I am aware, there is no protective relay or system of relays for isolating a generating unit when it falls out of step with other similar units connected to the same circuit.

It is the principal object of this invention, therefore, to provide a protective system to guard against continued operation of a generating unit when it has fallen out of synchronism with associated generating units, or when it has reached a condition with respect to other similar units such that it tends to assume a portion of the load greater than that which is was designed to supply.

Another object of my invention is the provision of a protective system for generating units which shall be effective, not only to disconnect the generator from its load circuit, but also to disconnect the prime mover associated with the generator from its supply of energy.

Another object of my invention is the provision of a system of the type described which shall be entirely automatic in operation, requiring no attention on the part of the operators of the generating unit.

Another object of my invention is to provide a system of the type described, which shall be reasonable in cost, efficient and accurate in operation and of such nature that its use will involve but slight change in existing installations.

According to my invention, I provide, in addition to the main generator and its associated prime mover, an auxiliary generator, preferably of the same number of poles and phases as the main generator. The auxiliary generator is mounted on the shaft of the main generator but may be driven in any suitable manner, provided, however, that the relative phase relation between its voltage and that of the main generator remains constant under all conditions.

In order to detect the existence of an out-of-phase condition of the voltage of the load circuit with respect to that of the particular generator unit to be protected, I provide a contact-making synchroscope, one coil of which is energized by the voltage of the auxiliary generator and the other coil by the voltage of the load circuit or distribution system.

It will be understood that, when the main generator is operating in synchronism with the other generators connected to the system, the system voltage is the resultant of the voltages of all the generators connected thereto. For this reason, it would not be possible to detect asynchronous operation of the generator by connecting one coil of the synchroscope to the distribution system and the other to the generator to be protected. It is necessary, on the other hand, to provide an auxiliary voltage having the phase position of that of the rotor of the main generator, for comparison with the system voltage and it is for this purpose that the auxiliary generator is provided.

Although other means for supplying the auxiliary voltage may be utilized, for example, an auxiliary winding on the main generator, I believe that an auxiliary generator such as I have disclosed is the simplest means for obtaining the auxiliary control voltage, but any equivalent means is to be construed as within the scope of my invention.

Well known relays may be employed to effect the disconnection of the main generator from the distribution or load circuit upon the occurrence of asynchronous conditions, and the prime mover may be disconnected from its energy supply simultaneously, and any other control functions may likewise be effected by the contact-making synchroscope when the phase relation between the voltage of the auxiliary generator and the voltage of the generator terminals has reached a predetermined condition.

My invention may be more fully comprehended from a study of the accompanying drawing, the single figure of which illustrates one embodiment of my invention.

Referring to the drawing, the generating unit 10 comprises a prime mover 11, which is actuated by energy supplied from any suitable source 12 under the control of a valve 13, and a main generating unit 14 which is adapted to supply electrical energy to the bus bars 15 under the control of the circuit breaker 16.

An auxiliary synchronous generator 17 is directly connected to the main generator 14, so as to be driven by its associated prime mover 11, to generate an auxiliary control voltage.

Connected to the bus bars 15 is a positive phase sequence network comprising transformers 18, a resistor 19 and a reactance 20. Such a positive phase sequence network is described in detail in U. S. Patent No. 1,571,224 granted February 2, 1926 to C. T. Allcutt and assigned to the assignee of this application. The function of this positive phase sequence network is to provide a voltage proportional to, and in phase with, that of the distribution system, for comparison with the voltage generated by the auxiliary generator 17 which, as already stated, is always approximately in phase with the internal voltage of the main generator 14.

The ordinary single phase voltages frequently used for relay purposes are not desirable for use with a system such as that described herein, because the operation of the system must be accurate and positive, even at times of system disturbances. It is generally recognized that single phase voltages taken from a polyphase system are unreliable at such times, since the phase relation of the voltages may be disturbed and the voltages may also decrease in magnitude to zero. A positive sequence voltage, on the other hand, is substantially correct for all conditions even when the system is subjected to a heavy unbalanced disturbance.

In order to compare the phase relations of the main generator 14 and the distribution circuit 15, I provide a contact making synchroscope 21 having its windings connected respectively to the auxiliary generator 17 and the positive phase sequence network. The synchroscope is provided with a contact segment 22 adapted to be engaged by the rotating arm 23 when the voltage of the generator 14 is at a predetermined phase relation with that of the system 15.

A relay 24 controlled by the synchroscope 21 is effective, when energized, to connect a motor or other equivalent electrical device 25 for closing the valve 13, to an auxiliary source of current 26, and to energize the trip coil 27 of the circuit breaker 16 at the same time, although either of these protective devices may be used without the other and, on the other hand, additional protective devices may be supplied if deemed necessary or desirable.

Although the operation of my invention is believed to be obvious from the foregoing explanation, a short description thereof will be included at this point.

Assuming that the generator 14 is not operating and that it is desired to start the generator and connect it to the load circuit 15, it will be necessary to provide a means for preventing the synchroscope 21 from effecting the energization of the valve motor 25 and the trip coil 27 during the time when the generator 14 is being synchronized with the lines 15. This result may be easily accomplished by the provision of a manual switch 28 in the circuit including the relay 24.

When the generator 14 has been properly synchronized with the load circuit 15, as may be indicated by the synchroscope 21, the circuit breaker 16 may be closed by any convenient means. When the generator has been connected to the circuit 15, it will operate in synchronism with other generating units which may be connected to the same circuit, in a well known manner, and will supply a portion of the total load on the distribution system. The load depends upon the phase angle between the voltage of the generator 14 and that of the system 15, which as already stated, is the resultant of the voltages of all of the generators supplying energy thereto. The system voltage, in other words, is identical with the apparent generator voltage, the actual generator voltage being somewhat in advance of the system voltage.

If the voltage of the generator 14 is caused to differ substantially in phase from the system voltage, either by reason of an overload on the generator or improper adjustment of the governor of the prime mover, the generator may fall out of step with the system 15. Under such conditions, the equivalent of a three-phase short circuit will exist and it is essential that the generator be immediately disconnected from the system 15. This type of fault is much more severe than the ordinary line-to-ground or line-to-line faults which occasionally occur on transmission lines. This fault condition is very serious, especially in closely connected distribution systems of the "loop" or "ring" type in which the distribution circuit makes a complete loop and is supplied with energy at a plurality of points thereof.

When the conditions above described obtain, the synchroscope 21 will be affected and its contact arm 23 will take up a position dependent upon the phase angle between the actual generator voltage and the system voltage, the magnitude of which angle is a measure of the overload or fault to which the generator is subject. When the phase angle between the generator and system voltage has reached a predetermined magnitude, the contact arm 23 of the synchroscope will engage the contact segment 22 to complete the circuit including the relay 24 and the current source 26, assuming that the manual switch 28 is closed as soon as the generator 14 is synchronized with and connected to the system 15. This switch may be interlocked with the circuit breaker 16 if desired. In the event of the pulling out of step of the generator 14, the relay 24 will operate immediately to complete a circuit to the valve motor 25 for disconnecting the supply of energy to the prime mover 11 and to energize the trip coil 27 to open the circuit breaker 16 and disconnect the generator 14 from the system 15.

I believe it will be apparent from the foregoing description that the system of my invention provides a generator protective system of utmost simplicity in design and of prompt and positive operating characteristics.

Although I have shown my protective system applied only to one generator, it is obvious, that for complete protection, similar protective means should be applied to all generators supplying energy to a common distribution circuit and the above disclosure is intended to represent only a single one of such units, it being within the contemplation of my invention to connect additional generating units to the distribution circuit such as that indicated at 15 and to provide each with means for isolating it when its voltage differs materially in phase from that of the system to which it is connected.

The provision of a protective system such as that disclosed herein is believed to be a substantial contribution to the electrical art, especially since no similar protective means have heretofore been available, even though the need therefor was very evident from the occasional occurrence of the conditions against which my invention is intended to guard.

Various changes may be made in the system I have disclosed, and it may be successfully combined with known protective systems and all such changes or combinations are intended to be included within the scope of the annexed claims.

I claim as my invention:

1. The combination with a distribution circuit, a main generator disposed to be connected thereto, a prime mover for said generator having a suitable energy source, of an auxiliary generator mechanically connected to said main generator so as to be driven by said prime mover, and a contact-making synchroscope responsive to the phase angle between the voltage of the circuit and that of the auxiliary generator for causing the main generator to be disconnected from said circuit and the prime mover to be disconnected from its source of supply.

2. The combination with a distribution circuit, a main generator disposed to be connected thereto, a prime mover for said generator having a suitable energy source, of an auxiliary generator mechanically connected to said main generator so as to be driven by said prime mover, and a contact-making synchroscope responsive to the phase angle between the voltage of the circuit and that of the auxiliary generator for causing the main generator to be disconnected from said circuit.

3. The combination with a distribution circuit, a main generator disposed to be connected thereto, a prime mover for said generator having a suitable energy source, of an auxiliary generator mechanically connected to said main generator so as to be driven by said prime mover, and a contact-making synchroscope responsive to the phase angle between the voltage of the circuit and that of the auxiliary generator for causing the prime mover to be disconnected from its source of supply.

4. The combination with a distribution circuit, a main generator disposed to supply energy thereto, a prime mover having a suitable energy source for driving said generator, of a direct-connected auxiliary generator disposed to generate a voltage in phase with that of the main generator, a contact-making synchroscope responsive to the phase angle between the voltage of the circuit and that of the auxiliary generator, and means controlled by said synchroscope for disconnecting said main generator and prime mover respectively from said circuit and said source of energy when the voltage of said main generator is substantially out of phase with that of the system.

5. The combination with a distribution circuit, a main generator disposed to supply energy thereto, a prime mover having a suitable energy source for driving said generator, of a direct-connected auxiliary generator disposed to generate a voltage in phase with that of the main generator, a contact-making synchroscope responsive to the phase difference between the voltage of the circuit and that of the auxiliary generator and means controlled by said synchroscope for interrupting the supply of energy to said prime mover.

6. The combination with a distribution circuit, a main generator disposed to supply energy thereto, a prime mover having a suitable energy source for driving said generator, of a direct-connected auxiliary generator disposed to generate a voltage in phase with that of the main generator, a contact-making synchroscope responsive to the voltage of the circuit and that of the auxiliary generator and means controlled by said synchroscope for disconnecting said main generator from said circuit.

7. In a distribution system, the combination with a main generator disposed to supply energy to the system, a prime mover for said generator and an energy source for said prime mover, of an auxiliary, direct-connected generator for generating a voltage in phase with that of said main generator, and means responsive to an out-of-phase condition of the voltage of the system with respect to that of the auxiliary generator for effecting the disconnection of said main generator from said system.

8. In a distribution system, the combination with a main generator disposed to supply energy to the system, a prime mover for said generator and an energy source for said prime mover, of an auxiliary, direct-connected generator for generating a voltage in phase with that of said main generator, and means responsive to an out-of-phase condition of the voltage of the system with respect to that of the auxiliary generator for effecting the interruption of the supply of energy to said prime mover.

9. In combination, a load circuit, a generator for supplying electrical energy to said circuit, a prime mover for said generator and a source of mechanical energy for said prime mover, means for generating a control voltage in phase with that of the generator and means responsive to a predetermined phase difference between the control voltage and the circuit voltage for disconnecting the generator from the circuit.

10. An electrical system comprising a load circuit, a generator for supplying electrical energy thereto, means for driving said generator and a source of energy for said driving means, means for generating a control voltage in phase with that of the generator and means responsive to a difference in the phase positions of the control voltage and the circuit voltage for disconnecting the generator from the load circuit.

11. In a power system, in combination, a transmission system having a voltage impressed thereon, a main generator disposed to be connected to the transmission system to impress a voltage thereon, means for driving said generator, a source of energy for the generator-driving means, an auxiliary generator for generating a control voltage, said generators being disposed to generate voltages which are in phase, a synchroscope disposed to respond to a phase difference between the voltages of the distribution system and the auxiliary generator, and means controlled by the synchroscope for effecting the disconnection of said main generator from the distribution system.

12. In a power-distribution system including a main generator driven by an associated prime mover, an energy source for said prime mover, means for detecting asynchronous operation of said generator comprising an auxiliary generator having a like number of poles and phases and being directly connected to the same prime mover as the main generator, a contact-making synchroscope being connected to the system and to the auxiliary generator, and a relay controlled by said synchroscope for causing the main generator to be disconnected from the system and the prime mover from its energy source when the phase angle between the voltage of the system and of the auxiliary-generator reaches a predetermined magnitude.

13. A protective system for detecting asynchronous operation of a main generator normally connected to a distribution circuit and driven by a prime mover comprising an auxiliary generator for the main generator driven by the same prime mover, and a contact-making synchroscope responsive to the voltage of said auxiliary generator and that of the circuit, and means controlled by said synchroscope for disconnecting said main generator from said circuit and the prime mover from its sources of energy when the phase angle between the voltages of the circuit and the auxiliary generator is of a predetermined value.

14. In a power-distribution system including a main generator and an associated prime mover for driving the generator, means for detecting asynchronous operation of the generator comprising an auxiliary generator for the main generator and a contact-making synchroscope connected between said auxiliary generator and said system, means controlled by said synchroscope for disconnecting said main generator from the system and its associated prime mover from its energy source when the voltages of the system and the auxiliary generator have a predetermined phase relation.

15. In combination, a distribution circuit having a voltage impressed thereon, a generator for impressing a voltage on the distribution circuit, means operable to disconnect the generator from the circuit, means actuated in accordance with the speed of the generator for developing a control voltage having the same phase relation as the generator, and means responsive to the occurrence of a predetermined phase relation between the control voltage and the distribution-circuit voltage for causing the disconnecting means to function.

16. In a polyphase transmission system including a plurality of synchronous machines connected thereto, a phase-responsive apparatus comprising quickly-responsive means for deriving an alternating current having a phase-angle corresponding to an important synchronous machine on the system, means for deriving an alternating current having a phase-angle corresponding to a polyphase voltage obtaining elsewhere in the system, and substantially unloaded phase-responsive means for comparing the first-mentioned derived current with the second-mentioned derived current.

17. In a polyphase transmission system including a plurality of synchronous machines connected thereto, a phase-responsive apparatus comprising quickly-responsive means for deriving an alternating current having a phase-angle corresponding to an internal voltage of an important synchronous machine on the system, means for deriving an alternating current having a phase-angle corresponding to a polyphase voltage of the system, and substantially unloaded phase-responsive means for comparing the first-mentioned derived current with the second-mentioned derived current.

18. In a polyphase transmission system including a plurality of synchronous machines connected thereto, a phase-responsive apparatus comprising quickly-responsive means for deriving an alternating current having a phase-angle corresponding to the rotor-position of an important synchronous machine on the system, means for deriving an alternating current having a phase-angle corresponding to a polyphase voltage of the system, and substantially unloaded phase-responsive means for comparing the first-mentioned derived current with the second-mentioned derived current.

19. The combination, with a three-phase power system, of a synchronous generator connected thereto, a prime mover driving said generator, quickly-responsive means for deriving an alternating current having a phase-angle corresponding to an internal voltage of said generator, means for deriving an alternating current having a phase-angle corresponding to a polyphase voltage of the system, and phase-responsive means for materially and quickly altering the effective prime-mover power in response to the relative phase-angle between said two derived currents.

20. The combination, with a three-phase power system, of a synchronous generator connected thereto, a prime mover driving said generator, quickly-responsive means for deriving an alternating current having a phase-angle corresponding to the rotor-position of said generator, means for deriving an alternating current having a phase-angle corresponding to a polyphase voltage of the system, and phase-responsive means for materially and quickly altering the effective prime-mover power in response to the relative phase-angle between said two derived currents.

21. In an alternating-current transmission system including a plurality of generators connected thereto and prime movers for said generators, means for controlling the effective prime-mover power of at least one of said generators, quickly-responsive means for deriving an alternating current having a phase-angle corresponding to an internal voltage of said generator, means for deriving an alternating current having a phase angle corresponding to the resultant of the voltages of a plurality of generators, and phase-responsive means for materially and quickly controlling said prime-mover control-means in response to a predetermined increase in the relative phase-angle between said two derived currents.

22. In an alternating-current transmission system including a plurality of generators connected thereto and prime movers for said generators, quickly-responsive means for deriving an alternating current having a phase-angle corresponding to an internal voltage of said generator, means for deriving an alternating current having a phase angle corresponding to the resultant of the voltages of a plurality of generators, and substantially unloaded phase-responsive means for comparing the first-mentioned derived current with the second-mentioned derived current.

23. In a polyphase transmission system including a plurality of synchronous machines connected thereto, a phase-responsive apparatus comprising quickly-responsive means for deriving an alternating current having a phase-angle corresponding to an important synchronous machine on the system, means for deriving an alternating current having a phase-angle corresponding to a polyphase voltage obtaining elsewhere in the system, and phase-responsive means for comparing the first-mentioned derived current with the second-mentioned derived current, characterized by means, responsive to such phase-angle, between the two derived currents, as indicates a loss of synchronism between said important synchronous machine and said voltage obtaining elsewhere in the system, for disconnecting said machine from the system.

24. In a polyphase transmission system including a plurality of synchronous machines connected thereto, a phase-responsive apparatus comprising quickly-responsive means for deriving an alternating current having a phase-angle corresponding to an internal voltage of an important synchronous machine on the system, means for deriving an alternating current having a phase-angle corresponding to a polyphase voltage of the system, and phase-responsive means for comparing the first-mentioned derived current with the second-mentioned derived current, characterized by means, responsive to such phase-angle, between the two derived currents, as indicates a loss of synchronism between said important synchronous machine and the system, for disconnecting said machine from the system.

25. In a polyphase transmission system including a plurality of synchronous machines connected thereto, a phase-responsive apparatus comprising quickly-responsive means for deriving an alternating current having a phase-angle corresponding to the rotor-position of an important synchronous machine on the system, means for deriving an alternating current having a phase-angle corresponding to a polyphase voltage of the system, and phase-responsive means for comparing the first-mentioned derived current with the second-mentioned derived current, characterized by means, responsive to such phase-angle, between the two derived currents, as indicates a loss of synchronism between said important synchronous machine and the system, for disconnecting said machine from the system.

26. In an alternating-current transmission system including a plurality of generators connected thereto and prime movers for said generators, quickly-responsive means for deriving an alternating current having a phase-angle corresponding to an internal voltage of said generator, means for deriving an alternating current having a phase angle corresponding to the resultant of the voltages of a plurality of generators and phase-responsive means for comparing the first-mentioned derived current with the second-mentioned derived current, characterized by means, responsive to such phase-angle, between the two derived currents, as indicates a loss of synchronism between said important synchronous machine and the rest of the system, for disconnecting said machine from the system.

27. In an extended three-phase synchronous transmission system, a substantially unloaded phase-angle-responsive instrument, and means for deriving, from said system, two diverse sources of voltage for said instrument, characterized by the fact that one of said derived-voltage sources is a positive-phase-sequence voltage-network connected across the phases of the system.

28. In an extended three-phase synchronous transmission system having a plurality of synchronous machines connected thereto, a substantially unloaded phase-angle-responsive instrument, and means for deriving, from said system, two diverse sources of voltage for said instrument, characterized by the fact that one of said derived-voltage sources is an auxiliary derived-voltage means driven from the shaft of one of said synchronous machines, and the other of said derived-voltage sources is a positive-phase-sequence voltage-network connected across the phases of the system.

29. In an extended three-phase synchronous transmission system having a plurality of synchronous machines connected thereto, a substantially unloaded phase-angle-responsive instrument, and means for deriving, from said system, two diverse sources of voltage for said instrument, characterized by the fact that one of said derived-voltage sources is a means for deriving a voltage which is substantially proportional to an internal voltage of one of said synchronous machines during all operative conditions thereof.

30. In an extended three-phase synchronous transmission system having a plurality of synchronous machines connected thereto, a substantially unloaded phase-angle-responsive instrument, and means for deriving, from said system, two diverse sources of voltage for said instrument, characterized by the fact that one of said derived-voltage sources is a means for deriving a voltage which is substantially proportional to an internal voltage of one of said synchronous machines during all operative conditions thereof, and the other of said derived-voltage sources is a positive-phase-sequence voltage-network connected across the phases of the system.

31. In an extended three-phase synchronous transmission system having a plurality of synchronous machines connected thereto, a phase-angle-responsive instrument, and means for deriving, from said system, two diverse sources of voltage for said instrument, characterized by the fact that one of said derived-voltage sources is an auxiliary derived-voltage means driven from the shaft of one of said synchronous machines, characterized by means, responsive to said instrument, at times, for automatically effecting a disconnection of said machine from the system.

32. In an extended three-phase synchronous transmission system having a plurality of synchronous machines connected thereto, a phase-angle-responsive instrument, and means for deriving, from said system, two diverse sources of voltage for said instrument, characterized by the fact that one of said derived-voltage sources is an auxiliary derived-voltage means driven from the shaft of one of said synchronous machines, and the other of said derived-voltage sources is a positive-phase-sequence voltage-network connected across the phases of the system, characterized by means, responsive to said instrument, at times, for automatically effecting a disconnection of said machine from the system.

33. In an extended three-phase synchronous transmission system having a plurality of synchronous machines connected thereto, a phase-angle-responsive instrument, and means for deriving, from said system, two diverse sources of voltage for said instrument, characterized by the fact that one of said derived-voltage sources is a means for deriving a voltage which is substantially proportional to an internal voltage of one of said synchronous machines during all operative conditions thereof, characterized by means, responsive to said instrument, at times, for automatically effecting a disconnection of said machine from the system.

34. In an extended three-phase synchronous transmission system having a plurality of synchronous machines connected thereto, a phase-angle-responsive instrument, and means for deriving, from said system, two diverse sources of voltage for said instrument, characterized by the fact that one of said derived-voltage sources is a means for deriving a voltage which is substantially proportional to an internal voltage of one of said synchronous machines during all operative conditions thereof, and the other of said derived-voltage sources is a positive-phase-sequence voltage-network connected across the phases of the system, characterized by means, responsive to said instrument, at times, for automatically effecting a disconnection of said machine from the system.

35. A protective apparatus for an alternating-current transmission system having a plurality of synchronous machines connected thereto, including a synchronous generator driven by a source of energy-input, said protective apparatus comprising a phase-angle-responsive instrument for responding to an internal voltage phase-angle of said generator with respect to another voltage phase-angle of the system, and means responsive to a predetermined condition of said instrument, such as would indicate, or lead to, loss of synchronism of said generator, for automatically throttling said generator input.

36. A protective apparatus for an alternating-current transmission system having a plurality of synchronous machines connected thereto, said protective apparatus comprising a phase-angle-responsive instrument for detecting such phase-position as would indicate, or lead to, loss of synchronism in a synchronous machine which is connected to the transmission system, said instrument including means for deriving, from said system, two diverse sources of voltage, one of said derived-voltage sources being responsive to an internal voltage phase-angle of the synchronous machine being protected, and means responsive to said loss-of-synchronism indication for automatically guarding against continued operation of said synchronous machine when it falls out of step with other synchronous machines connected to the system.

ROBERT D. EVANS.